(12) United States Patent
McDavid et al.

(10) Patent No.: US 12,337,820 B2
(45) Date of Patent: Jun. 24, 2025

(54) MACHINE HAVING HYDROGEN ENGINE HYBRID POWER SYSTEM AND CONTROL STRATEGY FOR SAME

(71) Applicant: Caterpillar Inc., Peoria, IL (US)

(72) Inventors: Robert M. McDavid, Dunlap, IL (US); Jonathan W. Anders, Peoria, IL (US); Bobby John, Peoria, IL (US); Timothy A. Bazyn, Chillicothe, IL (US); Youngjin Son, San Antonio, TX (US); Aaron W. Costall, London (GB); Radoslav B. Ivanov, Dupnitsa (BG)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/304,746

(22) Filed: Apr. 21, 2023

(65) Prior Publication Data

US 2024/0351573 A1 Oct. 24, 2024

(51) Int. Cl.
*B60W 20/15* (2016.01)
*F02B 39/10* (2006.01)
(Continued)

(52) U.S. Cl.
CPC ............ *B60W 20/15* (2016.01); *F02B 39/10* (2013.01); *F02D 41/0027* (2013.01); *F02D 41/1454* (2013.01)

(58) Field of Classification Search
CPC ............ F02D 19/0613; F02D 19/0615; F02D 19/0644; F02D 41/0007; F02D 41/0025
See application file for complete search history.

(56) References Cited

U.S. PATENT DOCUMENTS 6,647,724 B1 11/2003 Arnold et al.
9,034,529 B2 5/2015 Mueller et al.
(Continued)

FOREIGN PATENT DOCUMENTS

CN 108172861 A 6/2018
EP 1602817 12/2005
JP 2009174491 A 8/2009

OTHER PUBLICATIONS

Electric TurboCharger(ETC) for hydrogen-based fuel cell systems, IHI Corporation Vehicular Turbocharger, 4 pages, https://www.ihi.co.jp/turbocharger/en/products/electric_turbocharger/index.html#e01, downloaded Feb. 15, 2023.
(Continued)

*Primary Examiner* — John Kwon
(74) *Attorney, Agent, or Firm* — Brannon Sowers & Cracraft PC

(57) ABSTRACT

Operating a hybrid power system for a machine includes combusting a direct injected gaseous hydrogen fuel in an engine operating an electrical generator, and increasing a load demand of the hybrid power system. Operating the hybrid power system further includes operating an electrical-assist compressor to supply an increased airflow into the engine based on an increased engine power demand to satisfy the increased load demand. Air-fuel equivalence ratio of the engine (so-called "lambda") is maintained at a ratio of about 2 or greater to limit NOx emissions, and between a hydrogen fuel misfire limit and a hydrogen fuel preignition limit. Related apparatus and control logic is also disclosed.

10 Claims, 2 Drawing Sheets

(51) Int. Cl.
*F02D 41/00* (2006.01)
*F02D 41/14* (2006.01)

(56) References Cited

U.S. PATENT DOCUMENTS

| | | | |
|---|---|---|---|
| 10,270,248 | B2 | 4/2019 | Janardhan et al. |
| 11,261,779 | B2 | 3/2022 | Metz |
| 2006/0218923 | A1 | 10/2006 | Sopko et al. |
| 2013/0101502 | A1* | 4/2013 | McAlister ................ B60T 1/00 |
| | | | 701/1 |
| 2013/0158828 | A1* | 6/2013 | McAlister ................ B01J 4/002 |
| | | | 123/320 |
| 2019/0063347 | A1* | 2/2019 | Xiao ...................... F02D 41/26 |
| 2019/0337504 | A1* | 11/2019 | Kelly .............. B60W 30/18136 |
| 2021/0087981 | A1* | 3/2021 | Wang ................. F02D 41/0027 |
| 2022/0332429 | A1* | 10/2022 | Calder .................. B64D 33/02 |
| 2023/0138892 | A1* | 5/2023 | Wang ............... H01M 8/04716 |
| | | | 60/773 |
| 2023/0187677 | A1* | 6/2023 | Wang ........................ F02C 3/06 |
| 2023/0211887 | A1* | 7/2023 | Wang ..................... B60L 50/61 |
| | | | 244/55 |
| 2023/0211889 | A1* | 7/2023 | Wang .................... B64D 31/12 |
| | | | 244/53 R |

OTHER PUBLICATIONS

Filsinger, D., Ehrhard, J., Kuwata, G., & Ikeya, N. Electric turbocharger for fuel cells-IHI' s contribution to sustainable mobility, FC3 Fuel Cell Conference, 15 pages, Nov. 23, 2021.
Written Opinion and International Search Report for Int'l. Patent Appln. No.PCT/US2024/018292, mailed Mar. 4, 2024 (11 pgs).

* cited by examiner

MACHINE HAVING HYDROGEN ENGINE HYBRID POWER SYSTEM AND CONTROL STRATEGY FOR SAME

TECHNICAL FIELD

The present disclosure relates generally to operating a machine having a hybrid power system, and more particularly to operating an electric-assist compressor for an engine combusting hydrogen to satisfy a load demand of the hybrid power system.

BACKGROUND

Hybrid power systems have been known for many years. Well-known examples are built around an electrical generator operated by an internal combustion engine to power an electric motor onboard a mobile machine. Recent years have seen a proliferation of hybrid power system designs employing fuel cells, batteries, high-speed fly wheels, alternative fuels, and various other features and equipment arranged in virtually innumerable ways. Factors driving development of hybrid power systems include efficiency, emissions requirements, resource costs, and still others.

Hydrogen combustion engines for both traditional and hybrid power system applications have long been proposed and have experienced significant increases in research funding in recent years. Use of hydrogen fuel in an internal combustion engine can offer advantages respecting certain emissions, including particulate matter and so-called greenhouse gases. Hydrogen fuel internal combustion engines have shown much promise, however, the technology has yet to approach its full theoretical potential for commercial adoption.

For instance, while burning gaseous hydrogen fuel can at least in theory eliminate greenhouse gas emissions entirely, hydrogen is highly volatile and has a very rapid flame speed during combustion, requiring various modifications to engine design and control strategies. Moreover, internal combustion engines combusting gaseous hydrogen fuel can still produce undesirable amounts of oxides of nitrogen, or NOx, in the exhaust gases.

In hybrid applications where an internal combustion engine such as a diesel or natural gas engine operates an electrical generator it is often desirable to maintain operation of the engine in a relatively narrow range of engine speed and load. Combustion strategies and exhaust aftertreatment equipment, for example, may perform optimally when operating conditions remain relatively consistent. As such, engineers have developed a variety of strategies for responding to transient changes in the power demands on the overall system with reduced or optimized perturbation to engine operation. Recent efforts to manage transients in hydrogen combustion engines have revealed a slate of new challenges altogether different from those of traditional systems.

U.S. Pat. No. 10,270,248 to Janardhan et al. proposes one strategy for improving engine response during hybrid power generation. The art provides ample room for improvements and development of alternative strategies.

SUMMARY OF THE INVENTION

In one aspect, a method of operating a hybrid power system includes combusting a gaseous hydrogen fuel in a plurality of cylinders in an engine, and operating an electrical generator via the engine. The method further includes increasing a load demand of the hybrid power system, and increasing an engine power demand based on the increased load demand. The method still further includes operating an electric-assist compressor to supply an increased airflow into the engine based on the increased engine power demand.

In another aspect, a machine includes a hybrid power system including an engine having a plurality of cylinders formed therein, a first electric motor, and an electric-assist compressor motor structured to couple to an intake air compressor for the engine. The machine further includes a fuel system having a hydrogen fuel supply, and a plurality of hydrogen fuel injectors coupled to the engine. The hybrid power system further includes a power flow control unit structured to receive a request indicative of an increased load demand of the hybrid power system, output an electric-assist motor command to increase an airflow to the engine based on the increased load demand, and increase an engine power output based on the increased airflow to at least partially satisfy the increased load demand.

In still another aspect, a power control system for a hybrid power system in a machine includes a power flow control unit structured for coupling in communication via power electronics to a first electric motor and an electric-assist compressor motor for an engine coupled to an electrical generator. The power flow control unit is further structured to receive a request indicative of an electrical load demand of the first electric motor, and output an electric-assist motor command to vary an airflow to the engine based on the electrical load demand. The power flow control unit is further structured to satisfy the electrical load demand at least in part via a flow of electrical power from the electrical generator, and to determine the electric-assist motor command based on an engine air-fuel ratio term to maintain a lambda ratio of the engine between a hydrogen fuel preignition limit and a hydrogen fuel misfire limit.

DETAILED DESCRIPTION

Figure 1:
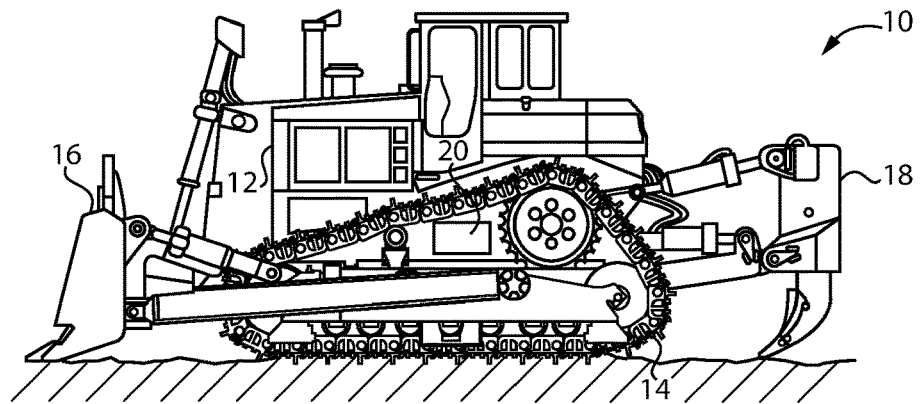
FIG. 1 is a diagrammatic view of a machine, according to one embodiment.

Referring to FIG. 1, there is shown a machine 10 according to one embodiment. Machine 10 is shown in the context of a land vehicle, namely, a track-type tractor having ground-engaging tracks 14 coupled to a frame 12. In other implementations the present disclosure can apply to other mobile machines including machines having ground-engaging wheels such as an off-highway truck. Still other machine implementations could include a track-type excavator, a wheel loader, a motor grader, a scraper, or any of a variety of other machines having ground-engaging propulsion elements. Some implementations could also include stationary applications, such as for electric power generation. Machine 10 also includes a front hydraulically actuated implement 16 such as a blade, and a back hydraulically actuated implement 18 such as a ripper. Other hydraulically actuated implement types such as booms, buckets, and still others are within the scope of the present disclosure. Machine 10 also includes a hybrid power system 20 for powering tracks 14 as well as front and back hydraulically actuated implements 16 and 18.

As will be further apparent from the following description, hybrid power system 20 is uniquely configured for operation on a gaseous hydrogen fuel in a range of conditions including transient power demand conditions.

Figure 2:
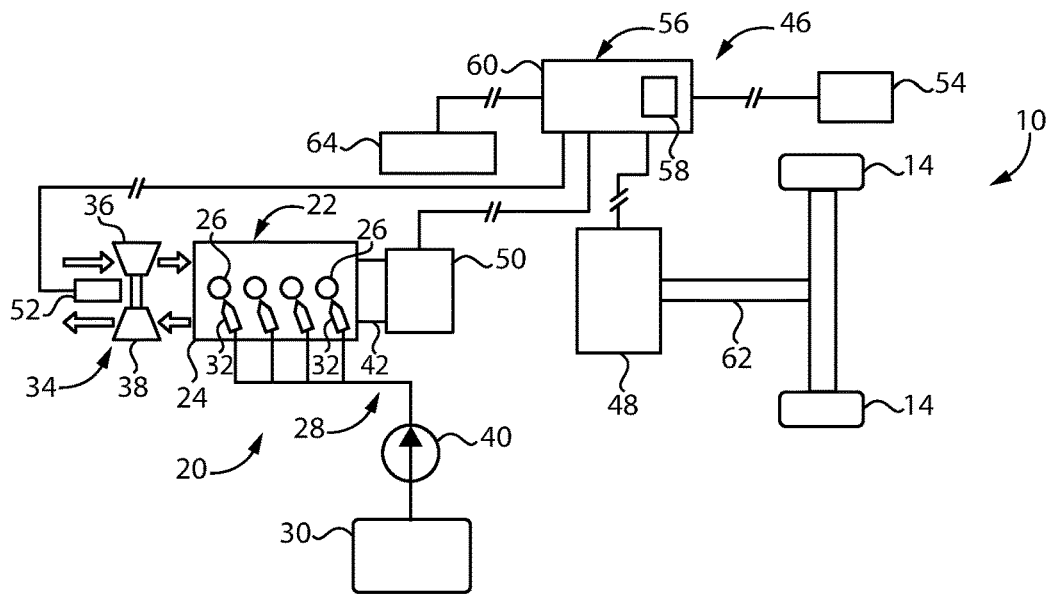
FIG. 2 is another diagrammatic view of a machine as in FIG. 1.

Referring also now to FIG. 2, machine 10 further includes an engine 22 having an engine housing 24 with a plurality of combustion cylinders 26 formed therein. Cylinders 26 can include any number of cylinders in any suitable arrangement such as an in-line pattern, a V-pattern, or still another. Machine 10 also includes a fuel system 28. Fuel system 28 includes a hydrogen fuel supply 30, and a plurality of hydrogen fuel injectors 32 coupled to engine 22. Hydrogen fuel injectors 32 may include a plurality of electrically-actuated direct hydrogen fuel injectors each configured to inject a gaseous hydrogen fuel from hydrogen fuel supply 30 directly into cylinders 26. A gaseous hydrogen fuel herein includes gaseous molecular hydrogen, as well as blends of gaseous fuels where gaseous molecular hydrogen predominates. Hydrogen fuel supply 30 may include a fuel tank storing gaseous molecular hydrogen in a pressurized state. In some instances, power system 20 could be equipped with a hydrogen reformer or fluidly connected to a line supply of hydrogen or various blends. A pump 40 may be provided in at least some embodiments to increase a pressure of gaseous hydrogen fuel to an injection pressure.

Machine 10 and power system 20 may further include a turbocharger 34 coupled to engine 22 and structured via an intake air compressor 36 to pressurize intake air supplied into engine housing 24. Turbocharger 34 also includes an exhaust turbine 38 that is driven by way of a flow of exhaust from engine 22 to rotate compressor 36. Power system 20 may also include a coupling 42 positioned operably between engine 22 and an electrical generator 50.

An electric motor 48, referred to herein at times as a first electric motor, may be coupled to a driveshaft 62 that rotates ground-engaging elements 14. In other embodiments individual wheel motors could be used. FIG. 2 illustrates a parallel hybrid drive arrangement. Other embodiments contemplated herein include a so-called series hybrid drive arrangement. Machine 10 may also include an implement pump 54 that is electrically operated as also further discussed herein.

Power system 20 also includes an electrical system 46. Electrical system 46 includes first electric motor 48, and electrical generator 50. Electrical system 46 also includes a power control system 56. Power control system 56 includes power electronics 60, such as various switches, inverters, and still other hardware, and a power flow control unit 58. Power flow control unit 58 may include any suitable computerized electronic control unit. Power flow control unit 58 might also include a computerized controller having more than one individual computerized control unit, such as multiple microprocessors or multiple microcontrollers. Power control unit 58 may also include a suitable computer readable memory such as RAM, ROM, FLASH, a hard drive, etc., storing computer executable program instructions which, upon execution, cause power system 20 to operate according to the present disclosure. The present disclosure is not limited with regard to any number or location of processors or other arrangement of computer architecture.

Power flow control unit 58 is structured for coupling in communication via power electronics 60 to first electric motor 48, and to other electrical components in power system 20. Electrical system 46 may also include an energy storage device 64. In an implementation energy storage device 64 includes an electrical energy storage device such as a battery although the present disclosure is not thereby limited. Electrical system 46 also includes an electric-assist compressor motor 52 structed to couple to, and as illustrated actually coupled to, intake air compressor 36. As will be further apparent from the following description electric-assist compressor motor 52 can be operated to vary intake airflow to engine 22 to vary engine power output in cooperation with fuel system 28 responsive to load demands on power system 20, including electrical load demands of electrical system 46.

To this end, power flow control unit 58 may be structured to receive a request indicative of an increased electrical load demand on first electric motor 48. It will be appreciated first electric motor 48 may include an electric traction motor coupled to at least one, and typically all, of ground-engaging elements 14. When machine 10 is operating in the field various conditions may arise varying electrical load demand on first electric motor 48 such as encountering a grade, pushing material, pulling a load, or still others. Other instances of a varied electrical load demand of electrical system 46 could include an electrical load demand increased to operate hydraulic implement pump 54, for example, or even to charge an energy storage device. A request indicative of an increased electrical load demand on first electric motor 48 could include an electrical signal request generated based on an operator actuating a control lever or depressing an accelerator pedal, for instance.

Power flow control unit 58 may be further structed to output an electric-assist motor command to vary an airflow to engine 22 based on the increased electrical load demand. When an increased electrical load demand of electrical system 46 occurs, to satisfy the increased electrical load demand an engine power demand on engine 22 may be increased in an effort to satisfy the increased electrical load demand such as by increasing an electrical power output of generator 50. Operating electric-assist compressor motor 42 to spool-up electric-assist compressor 36 can increase an amount of air conveyed into cylinders 26. At the same time fueling of engine 22 may be varied by increasing an amount of gaseous hydrogen fuel admitted into engine 22 for combustion based on the increased engine power demand. Engine power output may thus be increased on the basis of the increased airflow and the increased admission of gaseous hydrogen fuel, such as by direct injection, to operate electrical generator 50 to increase electrical power output in at least partial satisfaction of the increased electrical load demand.

As noted above, combusting a gaseous hydrogen fuel in an internal combustion engine can have various benefits including reduction or elimination of certain emissions, but nevertheless tends to emit exhaust containing NOx. It has been observed that operating an internal combustion engine at a stoichiometrically lean fuel-air ratio can limit NOx emissions levels. In an embodiment, power system 20 can be operated so as to maintain a lambda ratio of exhaust from engine 22 at about two (2) or greater by way of the increased airflow into the engine facilitated by operating electric-assist compressor 36. The term "lambda ratio" is to be understood herein as an air-fuel equivalence ratio.

Combustion of gaseous hydrogen fuel in an internal combustion engine has also been observed to be associated with relatively low exhaust energy as compared to traditional platforms such as diesel engines. As a result, exhaust impinging on turbine 38 may have insufficient exhaust energy to spool-up turbocharger 34 to optimal speeds providing optimal airflow. The additional energy input into engine 22 by way of electric-assist compressor motor 52 can compensate for this limited exhaust energy. In this way, energy can flow from battery 64, or another energy storage device, to electric-assist compressor motor 52 and to engine 22, enabling engine power output to be increased to increase an electrical power output of generator 50 in at least partial satisfaction of an increased electrical load demand of electrical system 46. As described above the increased electrical load demand may be from an electric traction motor but could also be from another electrical component such as pump 54, or still another.

The increased airflow into engine 22 will typically occur along with, or just prior to, an increased amount of admitted gaseous hydrogen fuel. An electric-assist motor command, such as an electrical control signal, may be produced by power flow control unit 58 on the basis of an air-fuel ratio term. An air-fuel ratio term may include a numerical term, stored in a map or calculated on the fly, determined to cause an air-fuel ratio of engine 22 to maintain a lambda value of engine 22 between a hydrogen fuel preignition limit and a hydrogen fuel misfire limit, including a lambda value of about two or greater as discussed above.

In instances where engine power output cannot satisfy an increased electrical power demand in electrical system 46 power flow control unit 46 may cause additional energy flow to occur from battery 64 or another energy storage device to electric motor 48. In such instances, power flow control unit 58 may output a discharging command to energy storage device 64 to compensate for an air-fuel ratio limitation of engine 22. An air-fuel ratio limitation means a threshold that cannot be practicably crossed without an undesired consequence to engine 22.

For example, in some instances engine 22 might be theoretically capable of producing sufficient power output to operate generator in satisfaction of an increased electrical load demand but would require more fuel than can be combusted at an air-fuel ratio providing a desired NOx output. Put differently, scenarios are envisioned where a lambda value sufficiently lean to keep NOx emissions below a desired level, such as a lambda value of about 2 or greater, is impractical to achieve, and power flow control unit 58 splits the power demand to satisfy an increased electrical load between generator 50 and energy storage device 64.

Figure 3:
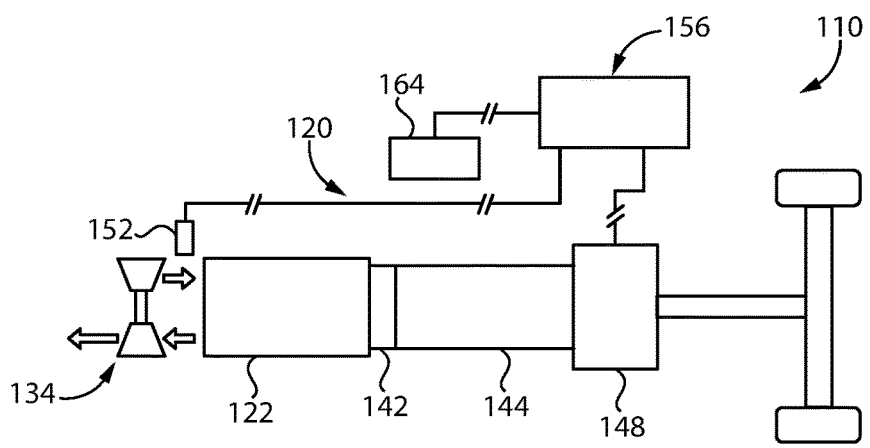
FIG. 3 is a diagrammatic view of a machine, according to another embodiment.

Referring now to FIG. 3, there is shown a machine 110 having similarities to the forgoing embodiments, but certain differences. Machine 110 includes a hybrid power system 120 including an engine 122 which may be configured and fueled similarly or identically to engine 22 discussed above, coupled via a clutch 142 to a transmission 144. Transmission 144 may include at least two gears and is structured to operate an electrical generator 148 configured as a motor-generator unit or "MGU". MGU 148 may operate as an electric traction motor that can provide regenerative electrical power for storage in a battery 164 or other energy storage device, such as when machine 110 is traveling down a grade or braking. MGU may also be driven directly via engine 122 and/or via a combination of engine 122 and electric power. Power system 120 may also include an electrically operated intake air compressor 152. The embodiment of FIG. 2 provides electric assist motor 52 coupled to turbocharger 38. In contrast, in power system 120, electrically operated intake air compressor 152 is a dedicated electric compressor separate from a standard turbocharger 134. A separate, dedicated electric compressor may be able to respond more rapidly than an electric-assist turbocharger due to lower inertia. Either configuration could be used in any of the embodiments contemplated herein.

INDUSTRIAL APPLICABILITY

Figure 4:
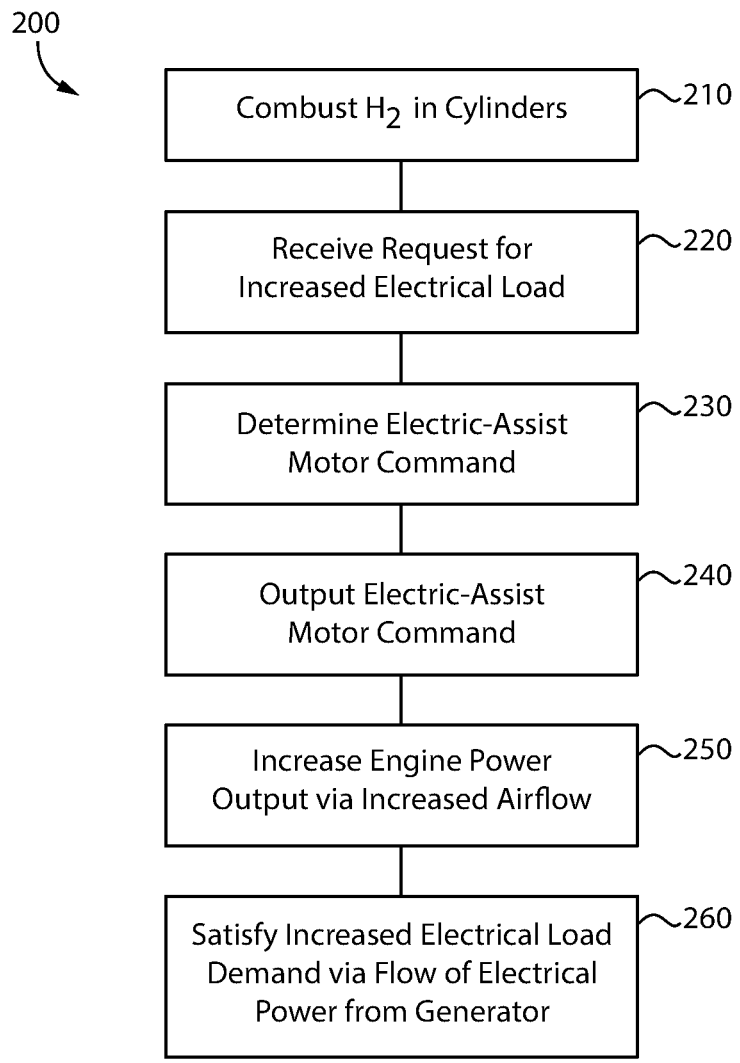
FIG. 4 is a flowchart illustrating example methodology and logic flow, according to one embodiment.

Referring to the drawings generally, but also now to FIG. 4, there is shown a flowchart 200 illustrating example methodology and logic flow according to one embodiment. At a block 210 gaseous hydrogen fuel is combusted in a plurality of cylinders in an engine. From block 210 flowchart 200 advances to a block 220 to receive a request for an increased electrical load in an electrical system of the machine. As discussed herein, the increased electrical load might result from a machine encountering a grade, engaging a pile of material to push or lift the material, actuating hydraulics, or still other conditions.

From block 220 flowchart 200 advances to a block 230 to determine an electric-assist motor command. As discussed herein, the electric-assist motor command may include a command that is determined to increase compressor speed to in turn increase an airflow into an engine whilst maintaining an air-fuel ratio of the engine at a lambda value of about two or greater and between a hydrogen fuel misfire limit and a hydrogen fuel preignition limit. The electric-assist motor command may also be determined on the basis of an amount of hydrogen fuel to be admitted into the engine. In some instances, the engine may be relied upon to provide as much power as possible in satisfaction of a transient increase in electrical power demand without resulting in a lambda value below about two. If additional power is required to satisfy a balance of an increased load demand, power flow control unit 58 determines a discharging command to satisfy an increased load demand via a flow of energy from an energy storage device. In other instances, splitting satisfaction of the power demand between an engine and energy storage could instead prioritize energy storage over an engine and/or take account of still other factors, such as a charge state of an energy storage device.

From block 230 flowchart 200 advances to a block 240 to output the electric-assist motor command. From block 240 flowchart 200 advances to a block 250 to increase engine power output via increased airflow, also as discussed herein. From block 250 flowchart 200 advances to a block 260 to satisfy the increased electrical load demand via a flow of electrical power from the generator. When an increased electrical load demand is satisfied the logic could return to execute again, or exit. It should be appreciated that while the present description focuses on increases in load demand, similar principles may govern decreases in load demand.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Terms of approximation such as "about" should be understood mean generally or approximately, or within measurement error in appropriate circumstances. Further, the phrase "based on" is intended to mean "based, at least in part, on" unless explicitly stated otherwise.

What is claimed is:

1. A method of operating a hybrid power system in a machine comprising:
    combusting a gaseous hydrogen fuel in a plurality of cylinders in an engine;
    operating an electrical generator via the engine;
    increasing a load demand of the hybrid power system;
    increasing an engine power demand based on the increased load demand;
    operating an electric-assist intake air compressor via an electric assist motor to supply an increased airflow into the engine based on the increased engine power demand;
    increasing an amount of gaseous hydrogen fuel admitted into the engine for combustion based on the increased engine power demand;
    increasing an engine power output based on the increased airflow and the increased amount of gaseous hydrogen fuel; and
    satisfying only a portion of the increased load demand via the increased engine power output, so as to limit an emissions level of the engine below a desired emissions level.

2. The method of claim 1 wherein the increasing an amount of gaseous hydrogen fuel includes increasing an amount of directly injected gaseous hydrogen fuel.

3. The method of claim 1 further comprising maintaining a lambda ratio of exhaust from the engine at about 2 or greater via the increased airflow into the engine.

4. The method of claim 1 wherein the increasing a load demand includes increasing an electrical load demand of an electric motor.

5. The method of claim 4 wherein the electric motor includes an electric traction motor.

6. The method of claim 4 further comprising satisfying the increased electrical load demand in part via increased electrical power output of the electrical generator and in part via an energy flow from an energy storage device.

7. The method of claim 6 wherein the energy storage device includes an electrical energy storage device.

8. A method of operating a hybrid power system in a machine comprising:
    combusting a gaseous hydrogen fuel in a plurality of cylinders in an engine;
    operating an electrical generator via the engine;
    increasing a load demand of the hybrid power system, including increasing an electrical load demand of an electric motor;
    increasing an engine power demand based on the increased load demand; and
    operating an electric-assist compressor to supply an increased airflow into the engine based on the increased engine power demand;
    satisfying the increased electrical load demand in part via increased electrical power output of the electrical generator and in part via an energy flow from an energy storage device; and
    splitting the satisfaction of the increased electrical load demand between the electrical generator and the energy storage device based on an air-fuel ratio limitation of the engine.

9. The method of claim 1 wherein the air-fuel ratio limitation is based on a desired emissions level.

10. The method of claim 9 wherein the desired emission level includes a desired NOx emissions level.

* * * * *